(12) United States Patent
Wallick et al.

(10) Patent No.: US 7,512,883 B2
(45) Date of Patent: Mar. 31, 2009

(54) PORTABLE SOLUTION FOR AUTOMATIC CAMERA MANAGEMENT

(75) Inventors: Michael Wallick, Coral Springs, FL (US); Yong Rui, Sammamish, WA (US); Le-wei He, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 10/883,123

(22) Filed: Jun. 30, 2004

(65) Prior Publication Data
US 2006/0005136 A1 Jan. 5, 2006

(51) Int. Cl.
*G06F 3/00* (2006.01)

(52) U.S. Cl. .................. 715/717; 715/719; 715/730; 715/757

(58) Field of Classification Search .............. 715/716, 715/719–726, 730, 757, 764–765, 767; 348/14.05, 348/211.12, 159; 709/205
See application file for complete search history.

(56) References Cited

U.S. PATENT DOCUMENTS

| | | | | |
|---|---|---|---|---|
| 5,307,295 | A * | 4/1994 | Taylor et al. ................... 703/1 |
| 5,610,653 | A * | 3/1997 | Abecassis ................... 348/170 |
| 5,745,126 | A * | 4/1998 | Jain et al. ................... 382/154 |
| 5,767,897 | A * | 6/1998 | Howell ................... 348/14.07 |
| 5,845,009 | A * | 12/1998 | Marks et al. ................ 382/228 |
| 5,859,623 | A * | 1/1999 | Meyn et al. ................. 715/730 |
| 6,040,841 | A * | 3/2000 | Cohen et al. ................ 345/473 |
| 6,386,985 | B1 * | 5/2002 | Rackham ..................... 472/75 |
| 6,392,694 | B1 * | 5/2002 | Bianchi ..................... 348/169 |
| 6,654,031 | B1 * | 11/2003 | Ito et al. ..................... 715/723 |
| 6,894,714 | B2 * | 5/2005 | Gutta et al. ............. 348/14.07 |
| 6,937,266 | B2 * | 8/2005 | Rui et al. ................. 348/14.05 |
| 7,002,584 | B2 * | 2/2006 | Saito ......................... 345/473 |
| 7,082,572 | B2 * | 7/2006 | Pea et al. .................... 715/720 |
| 2004/0105004 | A1 * | 6/2004 | Rui et al. .................... 348/159 |
| 2004/0263636 | A1 * | 12/2004 | Cutler et al. ........... 348/211.12 |
| 2005/0193343 | A1 * | 9/2005 | Kawabe et al. .............. 715/716 |
| 2005/0262201 | A1 * | 11/2005 | Rudolph et al. ............. 709/205 |
| 2005/0285933 | A1 * | 12/2005 | Rui et al. ................. 348/14.03 |

(Continued)

OTHER PUBLICATIONS

Foveal Systems, Michael Bianchi, Press Release, May 6, 2002, pp. 1-7.*

(Continued)

*Primary Examiner*—Ba Huynh
*Assistant Examiner*—Nicholas Augustine
(74) *Attorney, Agent, or Firm*—Lyon & Harr, LLP; Mark A. Watson

(57) ABSTRACT

A "virtual video studio", as described herein, provides a highly portable real-time capability to automatically capture, record, and edit a plurality of video streams of a presentation, such as, for example, a speech, lecture, seminar, classroom instruction, talk-show, teleconference, etc., along with any accompanying exhibits, such as a corresponding slide presentation, using a suite of one or more unmanned cameras controlled by a set of videography rules. The resulting video output may then either be stored for later use, or broadcast in real-time to a remote audience. This real-time capability is achieved by using an abstraction of "virtual cameramen" and physical cameras in combination with a scriptable interface to the aforementioned videography rules for capturing and editing the recorded video to create a composite video of the presentation in real-time under the control of a "virtual director."

23 Claims, 5 Drawing Sheets

U.S. PATENT DOCUMENTS

2008/0163089 A1* 7/2008 Altieri .................. 715/764

OTHER PUBLICATIONS

Bianchi, M., "AutoAuditorium: A Fully Automatic, Multi-Camera System to Televise Auditorium Presentations," *Proc. Of Joint DARPA/NIST Smart Spaces Technology Workshop*, Jul. 1998.

Gleicher, M.; Masanz, J., "Towards Virtual videography," ACM Multimedia 2000, Los Angeles, CA. Nov. 2000.

Gleicher, M.; Heck, R.; Wallick, M., "A Framework for Virtual Videography," Smart Graphics. Jun. 2002.

Liu, Q.; Rui, Y.; Gupta A.; and Cadiz, J., "Automating Camera Management for Lecture Room Environments," *Proc. of SIGCHI '01*, Seattle, WA.

Rui, Y.; Gupta, A.; Grudin, J., "Videography for Telepresentations," Proc. of ACM CHI 2003, Fort Lauderdale, FL. 2003.

* cited by examiner

PORTABLE SOLUTION FOR AUTOMATIC CAMERA MANAGEMENT

BACKGROUND

1. Technical Field

The invention is related to automated video recording and editing, and in particular, to a system and method for using a scriptable interface to control an abstraction of virtual cameramen in combination with physical cameras for predefining video editing rules to create automatically edited videos in real-time.

2. Related Art

Presentations such as speeches, lectures, seminars, classroom instruction, etc. are frequently recorded or captured using video recording equipment so that the presentation can be played back or viewed at some later time, or broadcast in real-time to a remote audience.

The simplest method for creating video recordings of such presentations is to have one or more human cameramen operating one or more cameras to record the various speakers and any slides or other visual aides used by the speaker during the presentation. Following the conclusion of the presentation, the recordings from the various cameras are then typically edited and combined to provide a final composite video which may then be made available for viewing. Alternately, the editing can also be done on the fly using a film crew consisting of one or more cameramen and a director, whose role is to choose the right camera and shot at any particular time.

Unfortunately, the use of human camera operators and manual editing of multiple recordings to create a composite video of various scenes of the presentation is typically a fairly expensive and/or time consuming undertaking. Consequently, several conventional schemes have attempted to automate both the recording and editing of presentations.

For example, one conventional scheme for providing automatic camera management and video creation generally works by manually positioning several hardware components, including cameras and microphones, in predefined positions within a lecture room. Views of the speaker or speakers and any PowerPoint™ type slides are then automatically tracked during the lecture. The various cameras will then automatically switch between the different views as the lecture progresses. Unfortunately, this system is based entirely in hardware, and tends to be both expensive to install and difficult to move to different locations once installed.

Another conventional scheme operates by automatically recording presentations with a small number of unmoving (and unmanned) cameras which are positioned prior to the start of the presentation. After the lecture is recorded, it is simply edited offline to create a composite video which includes any desired components of the presentation. One advantage to this scheme is that it provides a fairly portable system and can operate to successfully capture the entire presentation with a small number of cameras and microphones at relatively little cost. Unfortunately, the offline processing required to create the final video tends to very time consuming, and thus, more expensive. Further, because the final composite video is created offline after the presentation, this scheme is not typically useful for live broadcasts of the composite video of the presentation.

Another conventional scheme addresses some of the aforementioned problems by automating camera management in lecture settings. In particular, this scheme provides a set of videography rules to determine automated camera positioning, camera movement, and switching or transition between cameras. The videography rules used by this scheme depend on the type of presentation room and the number of audio-visual camera units used to capture the presentation. Once the equipment and videography rules are set up, this scheme is capable of operating to capture the presentation, and then to record an automatically edited version of the presentation. Real-time broadcasting of the captured presentation is also then available, if desired. Unfortunately, this scheme requires that the videography rules be custom tailored to each specific lecture room. Further, this scheme also requires the use of a number of analog video cameras, microphones and an analog audio-video mixer. This makes porting the system to other lecture rooms difficult and expensive, as it requires that the videography rules be rewritten and recompiled any time that the system is moved to a room having either a different size or a different number or type of cameras.

Therefore, what is needed is an automated video capture system and method that eliminates the need to provide human cameramen when recording a presentation. Further, such a system and method should provide for automatic real-time editing of the captured video, so as to allow for real-time broadcast of the edited presentation. Further, the system and method should be highly portable, such that it does not require complicated or time-consuming rewriting and recompiling of videography rules in the event that the meeting room or number or types of cameras are changed.

SUMMARY

A "virtual video studio", as described herein, operates to solve the problems existing with automated presentation capture, recording, and editing schemes by providing a highly portable system and method which automatically captures and records video of a presentation, such as, for example, speeches, lectures, seminars, classroom instruction, talk shows, teleconferences, etc., and accompanying exhibits, such as a corresponding slide presentation, using a suite of one or more unmanned cameras and microphones. In general, the virtual video studio addresses the aforementioned problems by providing a novel system and method which implements a scriptable interface for managing a simulated camera crew and director for controlling one or more physical cameras to produce real-time edited video of presentations.

Specifically, the virtual video studio provides for automatic real-time editing of the presentations by providing different views of a presenter, the audience, exhibits, or other views, as defined by a set of scriptable videography rules in combination with one or more digital video cameras (or digitized video signals from an analog video camera). These videography rules are designed to apply to various lecture room configurations and camera numbers and types, thereby allowing for quick set-up in various types of lecture rooms without the need to rewrite or recompile the videography rules.

Note that for purposes of explanation, each of these presentation types and the various settings in which they typically occur will be generically referred to throughout this document as a "presentation" taking place in a "lecture room." However, it should be clear in view of the discussion provided herein that the use of the virtual video studio described herein is not intended to be limited to mere presentations in lecture rooms. In fact, as noted above, the term "presentations" is generally used throughout this document to refer to a variety of situations, including, for example, a speech, lecture, seminar, classroom instruction, talk-show, teleconference, etc., along with any accompanying exhibits, such as a corresponding slide presentation.

In general, the virtual video studio provides the aforementioned presentation capture and editing capabilities by using an abstraction of "virtual cameramen" and physical cameras in combination with a scriptable interface to the videography rules for capturing and editing the recorded video to create a composite video of the presentation in real-time under the control of a "virtual director."

In particular, the virtual video studio described herein provides a system and method which simulates a professional human filming crew, with one virtual director, and multiple virtual cameramen. In general, the virtual director picks which virtual cameraman should be broadcasting at any given time. The virtual director communicates with each virtual cameraman by checking and setting a "status" within the virtual cameramen. For example, in one embodiment, when the virtual director wants a particular virtual cameraman to go on-air at any particular point in time, it will first set the virtual cameraman's state to "preview." This signals the virtual cameraman to prepare for broadcast. Once the virtual cameraman is ready, it sets its status to "ready," and reports this state back to the virtual director, which then sets the status of that virtual cameraman to "on-air" and begins broadcasting, or recording, the video feed from that virtual cameraman. When a virtual cameraman is to stop broadcasting, the virtual director simply changes the status for that virtual cameraman to "off-air."

Each virtual cameraman is assigned to cover, and track if necessary, a particular view, such as, for example, a speaker moving back and forth across a stage, an area of the lecture room where a slide presentation or the like is being displayed, all or part of the audience, particular members of the audience who may be speaking or asking a question, etc. Tracking of one or more moving speakers within some predefined area is achieved by using a histogram-based tracking method for estimating the current position of the speakers head. In alternate embodiments, any other conventional tracking system, such as, for example, conventional sound source localization (SSL) techniques, other types of edge detection-based tracking techniques, color-based tracking techniques, etc., may also be used to identify and track the speaker. The virtual cameraman assigned to track the speaker then provides a video feed, or a delimited portion of a larger video feed, that encompasses an area surrounding the current tracked position of the speaker as the speaker moves about during the presentation.

Further, the use of high resolution digital cameras, or a digital signal derived from an analog camera, allows for virtual pan-tilt-zoom capabilities to be provided by a single camera. The use of virtual pan-tilt-zoom (PTZ) capabilities provides significantly quicker response times than a conventional pan-tilt-zoom type camera which must first point to the area being filmed, then zoom and focus on that area. As a result, more than one of the virtual cameramen can make use of the video feed from a single camera by monitoring different portions of that video feed. For example, a single high resolution digital video feed can cover the entire area within which a speaker may be moving and presenting slides or other imagery. Digital pan-tilt-zooms of that video feed by one or more of the other virtual cameramen then provides coverage of other particular areas of the lecture room covered by the camera, in accordance with instructions from the virtual director, and as defined by the videography rules.

In a related embodiment, a video feed from one camera is used as an input to an image-based tracking algorithm for controlling the movement of a physical PTZ camera to keep a moving speaker in view of the conventional physical PTZ-type camera. In this embodiment, one virtual cameraman receives the input of both cameras and uses the input of one to track the movement of the speaker, and then uses the tracking information to point the physical PTZ camera to better capture a video feed of the speaker as the speaker moves about during the presentation. One advantage of this embodiment is that the physical PTZ-type camera can often provide a higher resolution view of a particular area, such as a tracked speaker, than can a digital view of that same area derived from a larger overall view.

In general, the videography rules operate to control a two part system which includes abstracted objects and a control script for commanding the abstracted objects relative to a set of one or more physical cameras which may include one or more associated microphones or microphone arrays. This control script generally describes the states in a system state machine (which represents the overall virtual video studio), relative to transition rules that the virtual director follows when switching from one view to the next. The separation between these two parts provides for straightforward portability to lecture rooms of various sizes and configurations.

Specifically, the abstracted objects include the aforementioned virtual director and virtual cameramen, and a communications interface between the virtual director and virtual cameramen. These abstracted objects are common to any different lecture room setting, thereby allowing for easy portability and quick setup for various different room sizes and types by simply placing the cameras in desired locations and providing a control script having the desired parameters. The control script is then used to control the abstracted objects relative to the physical cameras and any microphones for a specific lecture room without the need to rewrite, recompile, or otherwise modify the virtual director or any of the virtual cameramen.

For example, in a tested embodiment, three virtual cameramen were used to capture a presentation using a control script to provide real-time videography rules. Each of these virtual cameramen is defined as an abstract object representing a particular "type," including, for example, overview, slide tracking, and speaker tracking. A first type of virtual cameraman was defined as an overview cameraman that responsible for capturing an overview of the entire presentation area from a particular physical camera. A second type of virtual cameraman was defined as a slide tracking cameraman that was responsible for capturing video of the area of the lecture room in which presentation slides were to be presented. A third type of virtual cameraman was defined as a speaker tracking cameraman, and was responsible for tracking and capturing video of the speaker (using one or more physical cameras as input, i.e., one camera to track the speaker and one camera to actually capture the video of the tracked speaker for broadcast) as the speaker moved around within the lecture room during the presentation.

In this embodiment, a single high resolution digital camera was used to provide the various views to each of the virtual cameramen by using conventional digital pan, tilt, and zoom of the video images captured by the single camera. The virtual director then interpreted the videography rules of the control script to select and enable the view from one of the virtual cameramen for any particular time, with that selected view being immediately output in real-time to create the automatically edited video of the presentation.

As noted above, the videography rules of the control script generally define what physical cameras are available, and which virtual cameramen are assigned to which physical camera, and conditions under which each virtual cameraman will broadcast its video signal under direction of the virtual director.

For example, in one embodiment, the conditions include transition rules which define conditions under which the virtual director will order a transition from one state to the next; thereby controlling which virtual cameraman is currently broadcasting, and thus which view is currently being presented as an output video feed. In a related embodiment, these transition rules make use of computed confidence levels which indicate whether a particular virtual cameraman is currently successfully capturing its assigned subject, such as, for example, a moving speaker, or a new presentation slide. Transitions can then be made based on the confidence level and transition rules. For example, where a virtual cameraman has a sufficiently high confidence that a new slide is being displayed, the virtual director may automatically switch to the broadcast from that virtual cameraman, so as to display the new presentation slide. Similarly, if the virtual cameraman responsible for tracking a moving speaker has a sufficiently low confidence of speaker location, the virtual director may automatically direct that the view of that virtual cameraman be zoomed out to encompass a larger area, thereby likely bringing the speaker back into the view of that virtual cameraman until a better tracking confidence is established.

In another embodiment, one or more of the virtual cameramen is also assigned a broadcast time. In the event that a particular cameraman has broadcast a particular view for its assigned time, the virtual director will then select another virtual cameraman for broadcast so as to provide a variety of views in the output video.

Finally, in one embodiment, all of the aforementioned scripting rules, including states, transition rules, confidence levels, and broadcast times are combinable and editable via a user interface so to as to provide a desired level of user control over the automatically generated video that is derived from the broadcasts of the virtual cameramen under the direction of the virtual director.

In view of the above summary, it is clear that the virtual video studio described herein provides a unique system and method for automatically capturing and editing presentations in real-time by using a combination of virtual directors and cameramen and physical cameras and microphones under the constraints of a set of videography rules. In addition to the just described benefits, other advantages of the virtual video studio will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
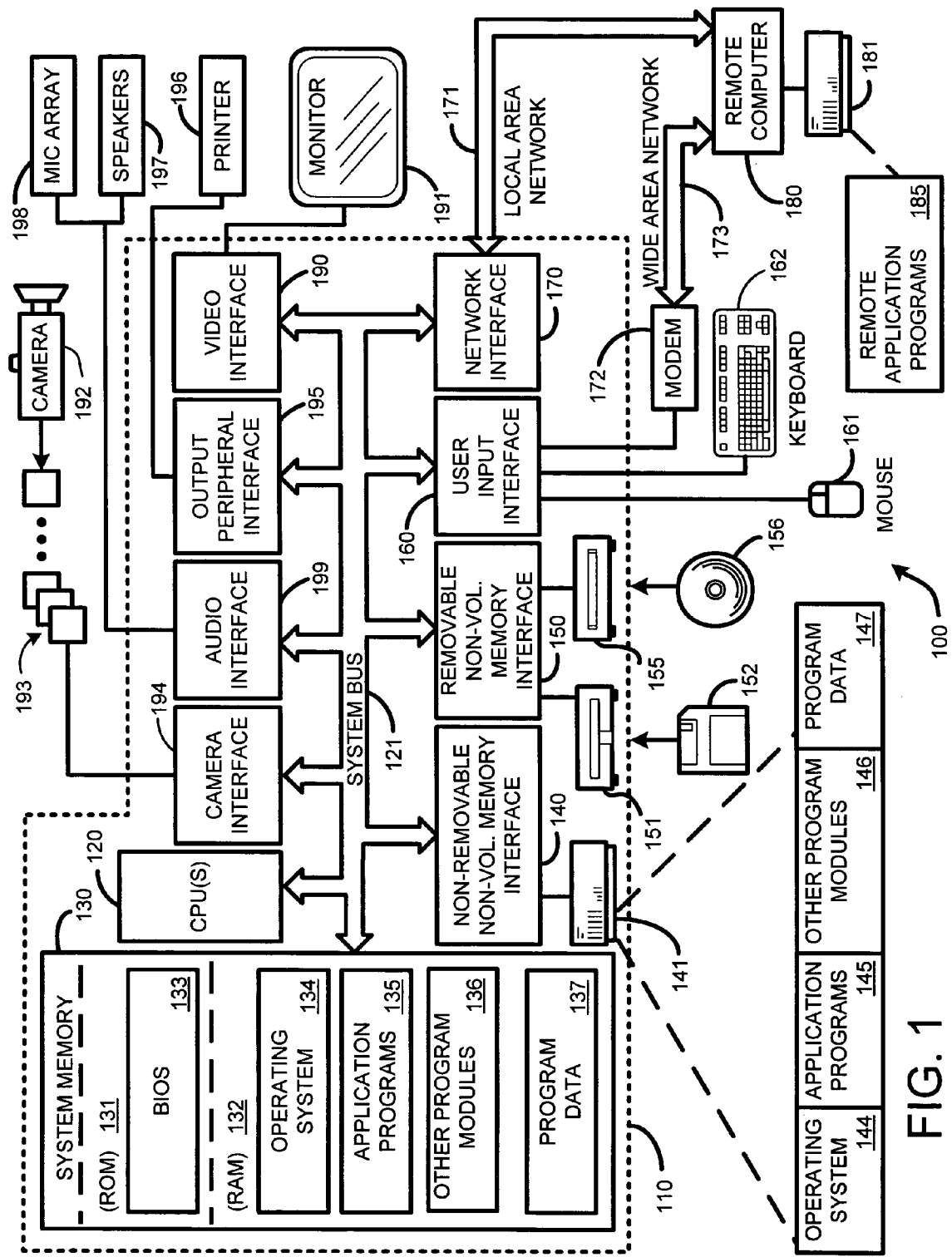
FIG. 1 is a general system diagram depicting a general-purpose computing device constituting an exemplary system implementing a virtual video studio, as described herein.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor 191, computers may also include other peripheral output devices such as a printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras of various types may be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194 using conventional interfaces, including, for example, USB, IEEE 1394, Bluetooth™, etc. This interface is connected to the system bus 121, thereby allowing the images 193 to be routed to and stored in the RAM 132, or any of the other aforementioned data storage devices associated with the computer 110. However, it is noted that previously stored image data can be input into the computer 110 from any of the aforementioned computer-readable media as well, without directly requiring the use of a camera 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a "virtual video studio" which provides automated presentation capture and editing capabilities by using an abstraction of "virtual cameramen" and physical cameras in combination with a scriptable interface to a set of videography rules for capturing and editing the recorded video to create a composite video of the presentation in real-time under the control of a "virtual director."

2.0 Introduction:

A "virtual video studio", as described herein, provides a highly portable real-time capability to automatically capture, record, and edit a composite video of a presentation, such as, for example, a speech, lecture, seminar, classroom instruction, talk-show, teleconference, etc., along with any accompanying exhibits, such as a corresponding slide presentation, using a suite of one or more unmanned cameras controlled by a set of videography rules. The resulting video output may then either be stored for later use, or broadcast in real-time to a remote audience. This real-time capability is achieved by using an abstraction of "virtual cameramen" of various predefined types, and physical cameras in combination with a scriptable set of videography rules for capturing and editing the recorded video to create a composite video of the presentation in real-time under the control of a "virtual director."

Note that for purposes of explanation, each of the various presentation types noted above, and the various settings in which they typically occur, will be generically referred to throughout this document as a "presentation" taking place in a "lecture room." However, it should be clear in view of the discussion provided herein that the use of the virtual video studio described herein is not intended to be limited to mere presentations in lecture rooms.

Further, the following description of the virtual video studio makes use of several terms that are defined below for purposes of explanation. These terms include "type," "status," and "state."

In particular, the term "type" refers to what a particular camera input is being used for, i.e., an overview camera, a tracking camera, a slide camera, etc. Therefore, these camera "types" are absolute and are defined in terms of the abstract objects represented by the various virtual cameramen which are created with predefined behaviors. In other words, each of the predefined virtual cameramen has a predefined type, such as, for example, overview cameraman, a speaker tracking cameraman, and a slide tracking cameraman, as described in further detail below. Further, while new camera "types" can be created, the creation of such types requires that new virtual cameramen be defined, created and included with the aforementioned abstract objects for use with the virtual director. In addition, in the control script, each of these types is given a "type name." Then access to each of the virtual cameraman types is achieved by using the associated name for calling that particular type. In this manner, the same type of virtual cameraman can be used with different transition rules (i.e., different transition "states") by simply using different type names for accessing a particular type with different rules represented by a different state.

The term "status" refers to what a particular camera is actually doing at any particular time, with the virtual director checking and setting the status of each camera, via the virtual cameramen, at any particular time. For example, the term status is used to refer to whether any particular camera is on-air, off-air, in preview, ready, etc. Consequently, as part of the control script, each named type of virtual cameraman also includes an assignment to a particular physical camera, so that the virtual director can determine or set the status of each camera via one of the associated virtual cameramen.

Finally the aforementioned term "state" is used to refer to the present configuration of a state machine which describes where the overall system is at, i.e., a tracking state, a slide state, an overview state, etc., as described in further detail below. For example, each "state" has one camera associated with it, via an associated type name, and as the lecture proceeds, the virtual video studio system moves through the various states under the control of the virtual director. In general, the states are generic; they basically just have a camera associated with them. In one embodiment, the control script also includes a "name" for each state for scripting purposes. Further, naming or labeling the states allows easy transition from one state to another by using the state names as control points or headers for the moving or jumping to particular points in the control script which define a state transition.

For example, in one embodiment, when setting up the control script, one virtual cameraman has a type of "overview cameraman" (or simply "Overview"), an associated type name of "OverviewCam," and an assignment to a particular physical camera, with which the overview cameraman maintains a computer connection or interface. This control script also includes a state name to be associated with the particular type name. For example, in one embodiment, the OverviewCam type name was assigned an associated state name of "OverviewState." Then, whenever the virtual director wants to show the view monitored by the physical camera assigned to OverviewCam, the virtual director will order a transition to the state named "OverviewState." This view will then be maintained by the virtual director until the virtual director determines that the scripting rules associated with OverviewState dictate a transition to another named state.

2.1 System Overview:

As noted above, the virtual video studio described herein provides a system and method for capturing, recording and editing a plurality of video streams of a presentation in real-time to create a composite video of that presentation. The virtual video studio makes use of one or more physical video cameras in combination with a virtual director, a plurality of virtual cameramen (one for each scene or area being captured or recorded), with each virtual cameraman having a particular type, including for example, an overview cameraman, a slide tracking cameraman, or a speaker tracking cameraman, and a control script which contains scriptable videography rules for enabling the virtual director to automatically transition between the broadcasts of the individual virtual cameramen.

In general, the scripted videography rules operate to control a two part system which includes: 1) abstracted objects (the virtual director and virtual cameramen, and a communications interface between the virtual director and virtual cameramen); and 2) a control script for commanding the abstracted objects relative to a set of one or more physical cameras which communicate with one or more of the virtual cameramen via a computer interface, and which may also include one or more associated microphones or microphone arrays. The videography rules of the control script, as discussed in further detail in Section 3.3, generally describe the cameras to be used, states in the system state machine representing the virtual video studio, and transition rules that the virtual director should follow when switching or transitioning from one view to the next.

Further, the control script interfaces with the abstracted objects without the need to rewrite, recompile, or otherwise modify either the virtual director or any of the predefined types of virtual cameramen. Consequently, the separation between these two parts of the virtual video studio provides for straightforward portability to lecture rooms of various sizes and configurations, because it is not necessary to modify either the virtual director or any of the virtual cameramen when changing locations. In fact, all that is needed to set up the virtual video studio for use in a new location is to simply place each of the physical cameras in desired locations and provide a control script having the desired parameters for interfacing with and controlling the virtual director, which in turn directs one or more of the virtual cameramen, with each virtual cameraman being assigned to, and in communication with, one of the physical cameras.

As noted above, each physical camera is associated with one or more of the virtual cameramen. Further, each virtual cameraman is assigned to cover, and in some cases track, a particular view, such as, for example, a speaker moving back and forth across a stage, an area of the lecture room where a slide presentation or the like is being displayed, all or part of the audience, particular members of the audience who may be speaking or asking a question, particular speakers seated at a table for a video conference, etc. The generic behavior of each virtual cameraman is denoted by its predefined "type," which as noted above, and described in further detail below, includes overview, slide tracking, and speaker tracking.

In one embodiment, tracking of one or more moving speakers within some predefined area by a virtual cameraman with a speaker tracking type is achieved by using a histogram-based tracking method, as described in further detail in Section 3.2.3, for estimating the current position of the speakers head. In alternate embodiments, any other conventional tracking system, such as, for example, conventional sound source localization (SSL) techniques, edge detection-based tracking techniques, color-based tracking techniques, etc., may also be used to identify and track the current speaker or speakers. Conventional SSL techniques are often very useful for locating a particular speaker in the case of a video teleconference. In any case, the virtual cameraman assigned to track the speaker then provides a video feed, or a delimited portion of a larger video feed, that encompasses an area surrounding the current tracked position of the speaker as the speaker or speakers move about or change during the presentation.

As noted above, more than one of the virtual cameraman may be associated with a particular camera. However, by using a sufficiently high resolution video signal, each virtual cameraman is still capable of broadcasting different views from the same camera. In particular, the use of sufficiently high resolution digital cameras, or a digital signal derived from an analog camera, allows for virtual pan-tilt-zoom capabilities to be provided by a single camera. The use of virtual pan-tilt-zoom capabilities provides significantly quicker response times than a conventional pan-tilt-zoom type camera which must first point to the area being filmed, then zoom and focus on that area. As a result, more than one of the virtual cameramen can make use of the video feed from a single camera by monitoring different portions of that video feed.

For example, a single high resolution digital video feed can cover the entire area within which a speaker may be moving and presenting slides or other imagery. Digital pan-tilt-zooms of that video feed by one or more of the other virtual cameramen then provides coverage of other particular areas of the lecture room covered by the camera, in accordance with instructions from the virtual director, and as defined by the videography rules. However, it should be clear that there is no requirement that one camera is used to provide a feed to multiple virtual cameramen, and in fact, each virtual cameraman can be assigned to either the same or to completely different physical cameras.

Figure 2:
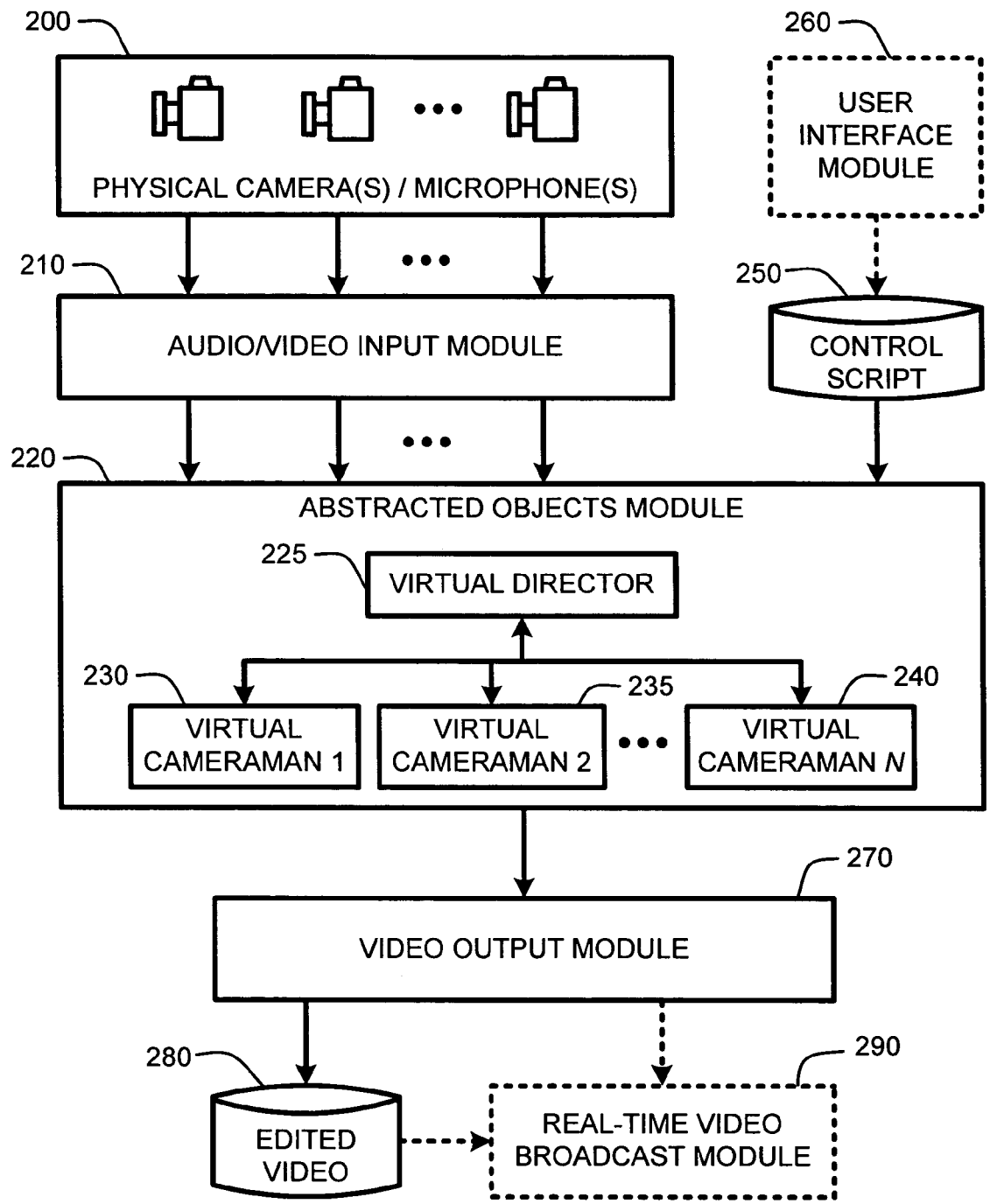
FIG. 2 illustrates an exemplary architectural system diagram showing exemplary program modules for implementing a virtual video studio, as described herein.

2.2 System Architectural Overview:

The processes summarized above are illustrated by the general system diagram of FIG. 2. In particular, the system diagram of FIG. 2 illustrates the interrelationships between program modules for implementing the virtual video studio, as described herein. It should be noted that any boxes and interconnections between boxes that are represented by broken or dashed lines in FIG. 2 represent alternate embodiments of the virtual video studio described herein, and that any or all of these alternate embodiments, as described below, may be used in combination with other alternate embodiments that are described throughout this document.

In general, as illustrated by FIG. 2, the virtual video studio uses one or more video cameras 200 (with microphones, if desired) to capture various regions or views within a lecture room during a presentation. An audio/video input module 210 then receives the output of each of the video cameras 200 and provides it, via a conventional computer interface, to an abstracted objects module 200 which contains a virtual director 225, and one or more virtual cameramen 230 through 240.

As described herein, each virtual cameraman 230, 235 and 240 is responsible for a capturing a particular view from one of the cameras 200, and may also be required to track speakers or changing presentation slides for capturing the assigned view of the lecture room. The virtual director 225 directs the broadcast status of each of the virtual cameramen 230, 235 and 240, and automatically transitions between the various states of a control script 250, and thus the resulting video broadcasts of the various virtual cameramen in accordance with the control script which contains a set of videography rules that are tailored to the particular camera setup in the particular lecture room being filmed. As described in greater detail below in Section 3.3, the videography rules of the control script 250 generally define what physical cameras are available, and which type of virtual cameramen are assigned to which camera. In addition, these rules also define the conditions under which the virtual director will order state transitions, thereby controlling when each virtual cameraman begins broadcasting, or ceases broadcasting, its video signal.

In one embodiment, a user interface 260 is provided for editing the control script 250. In this embodiment, the control script is provided as a simple human readable text file which can be easily edited using conventional text editing techniques to provide the desired interaction between the virtual director 225 and each of the virtual cameramen 230, 235 and 240. The control script 250 is then automatically interpreted by the virtual director for use in capturing, editing and outputting the video of the presentation. Note that an exemplary control script is illustrated below in Section 3.3 for a simple case using of a first physical camera providing input to three virtual cameramen, and a second PTZ-type physical camera being controlled by a speaker tracking analysis of the input of the first physical camera by one of the three virtual cameramen.

As noted above, the virtual director 225 controls state transitions which in turn control the status of each of the virtual cameramen 230, 235 and 240 based on continuous real-time interpretations of the videography rules provided in the control script 250. Therefore, while each of the video streams output by each of the cameras is provided as an input to the abstracted objects module 220, the actual output of the abstracted objects module is a single video stream which represents the current status of each of the virtual cameramen 230, 235 and 240. In other words, given multiple input video streams to the various virtual cameramen 230, 235 and 240, the virtual director 225 acts as an automated gatekeeper to control which of the virtual cameramen is currently broadcasting an output video stream in accordance with the videography rules of the control script 250. It should be noted that in one embodiment, it is also possible to allow more than one virtual cameraman to broadcast simultaneously, so as to provide for picture-in-picture type effects or for simultaneously outputting two or more video streams.

Finally, the video stream or streams output by the abstracted objects module 220 is then provided to a conventional video output module 270 which provides a conventional video/audio signal for storage 280 or real-time broadcast or playback via a real-time video broadcast module 290. Broadcast or playback of the video/audio signal provided by the video output module 270 uses conventional video playback techniques and devices.

3.0 Operation Overview:

The above-described program modules are employed for implementing the virtual video studio for automatic camera control and video production. As summarized above, this virtual video studio provides a system and method for capturing, recording and editing a plurality of video streams of a presentation in real-time to create a composite video of that presentation. The following sections provide a detailed discussion of the operation of the virtual video studio, and of exemplary methods for implementing the program modules described in Section 2 in view of the operational flow diagram of FIG. 6 which is presented following a detailed description of the operational elements of the virtual video studio.

3.1 Operational Details of the Virtual Video Studio:

The following paragraphs detail specific operational embodiments of the virtual video studio described herein. In particular, the following paragraphs describe the abstracted objects (virtual director and virtual cameramen); histogram-based speaker tracking; and the videography rules provided by the control script.

3.2 Abstracted Objects and Physical Cameras:

As noted above, the virtual director and each of the virtual cameramen along with the communication interface between them are defined as abstracted objects which are common to all the different lecture room settings. These abstracted objects are then addressed by a real-time and ongoing interpretation of the videography rules of the control script. In a tested embodiment, these abstracted objects were implemented using a flexible DMO, or DirectX™ Media Object. The DMO may have any number of physical cameras connected to it. Further, DirectShow™ (the technology a DMO is based on) abstracts the physical camera type, meaning that any camera type (digital or analog), or any combination of cameras or camera types, may be connected to the virtual video studio system. However, it should be clear that although used in a tested embodiment, the virtual video studio described herein is not intended to be limited to use with DirectX™ Media Objects or the like. In fact, as should be appreciated by those skilled in the art, there are a number of other methods for coding such abstracted objects, including, for example, the use of DLL's or other types of computer programs and applications.

As noted above, any of a number of conventional camera types may be used in combination with the virtual video studio. In fact, virtually any camera which is capable of being interfaced with a computer, and by extension to the virtual video studio, may be used. For example, in a tested embodiment of the virtual video studio, an Aplux 1.3 mega-pixel USB2.0 digital video camera was used in combination with a Sony™ EVI-D30 Pan-Tilt-Zoom (PTZ) analog camera to supply video feeds to multiple virtual cameramen. It should be noted that the use of these particular cameras is in no way intended to limit the scope of cameras or camera types compatible with the virtual video studio.

In fact, the easy availability of relatively inexpensive and high resolution video cameras is an important factor in the portability of the virtual video studio. Further, newer video cameras can typically be connected directly to a computer's existing ports (USB interfaces, IEEE 1394 interfaces, Bluetooth™ wireless interfaces, IEEE 802.11 wireless interfaces, etc). Any such camera can be used by the virtual video studio. Consequently, virtually any conventional desktop or portable computer is now capable of being outfitted with one or more high resolution video cameras. Further, because the resolution of these video cameras is so high, it is possible for a single camera to mimic actions of several lower resolution cameras digitally. In fact, in a small room, a single physical camera can easily replace two or more separate cameras while digitally providing the same or very similar outputs that would be provided by the individual cameras.

3.2.1 Virtual Director:

In general, the purpose of the virtual director is to monitor and order or control the status of each of the various virtual cameramen based on the virtual directors' interpretation of the videography rules of the control script. As noted above, the virtual director is an abstract element of the virtual video studio that interprets scripted videography rules in real-time to direct, or transition the states of the virtual video studio for controlling the current status of each of the various virtual cameramen, thereby controlling which scene or view is currently being output by the virtual video studio from a plurality of input video streams. Further, as described above, abstraction of the virtual director allows for easy portability of the virtual video studio to lecture rooms of various sizes and configurations since it is only necessary to modify the control script to better fit particular camera and room configurations, rather than modifying or editing the virtual director.

3.2.2 Virtual Cameramen:

Each physical camera connected to the virtual video studio is processed internally by one or more of the virtual cameramen, with each type of virtual cameraman receiving an input from an associated physical camera and producing the correct output shot given the input from that physical camera. Further, in the case where a virtual cameraman is responsible for tracking a moving person or other object, the virtual cameraman will also be allowed to control camera motion, including pan, tilt, and zoom, if necessary, in order to achieve its defined purpose. Further, in one embodiment, in the case where a virtual cameraman is responsible for tracking a moving person or other object, that virtual cameraman can also receive the input from two physical cameras, with the input from one of the cameras being used to provide tracking information for pointing and zooming the other camera so as to capture the shot of the tracked person or object.

In a tested embodiment, three basic types or categories of virtual cameramen are defined: an "overview cameraman," a "slide tracking cameraman," and a "speaker tracking cameraman." Each physical camera then serves as input to one or more of these virtual cameramen, with each individual cameraman then processing the video input of the corresponding physical camera based on predefined behaviors for each type of virtual cameraman.

In general, the overview cameraman captures the entire podium or stage area, or some other fixed or predefined area, such as, for example an audience or a classroom full of students. Because the area monitored by the overview cameraman is predefined or fixed, once the camera is set up to view the area in question, the only thing that the overview cameraman needs to do, other than report its current state to the virtual director, is to either broadcast the captured video stream of the viewed area, or not, in accordance with the status instructions provided by the virtual director.

Similarly, a slide tracking cameraman monitors a predefined area, such as the lecture room display screen or slide presentation area, and detects changes in the monitored area that are indicative of a new slide being presented. Conventional image differencing techniques are used for comparing prior and current image frames of the monitored area to detect changes of a magnitude sufficient to indicate that a new presentation slide has been presented in the monitored area. As with each virtual cameraman, the slide tracking cameraman reports its current state to the virtual director. In addition, the slide tracking cameraman also reports a confidence level (derived from the aforementioned image frame comparison), which indicates the likelihood that a new slide is being presented. Further, in one embodiment, the slide tracking cameraman interfaces directly with a conventional slide presentation program, such as, for example, PowerPoint™, and reports a slide change whenever the slide is actually changed without the need to actually compare prior and current frames of the monitored area.

The speaker tracking cameraman is designed to track the speaker in an image sequence and use either virtual or physical pan-tilt-zoom capabilities to ensure that the speaker is within the image frames being captured by the camera assigned to the speaker tracking cameraman. In one embodiment, a histogram-based tracking system, as described in further detail in Section 3.2.3 computes a binary difference between image frames that are sufficiently close in time and generates a height weighted histogram for identifying the probable location of the speakers head. However, other conventional speaker tracking methods, such as sound-source localization (SSL), other motion-based tracking techniques, edge detection-based tracking techniques, color-based tracking techniques, etc., may also be used by the speaker tracking cameraman for tracking the speaker as the speaker moves about the podium, stage area, front of the classroom, etc.

In one embodiment, the speaker tracking cameraman is designed to track multiple persons or speakers within some predefined region of interest. Automatic zooming of the search area is then used to ensure that all tracked speakers are within the captured image frame. Similarly, where the speaker tracking cameraman looses the tracked speaker, or where the tracking returns a low probability or confidence of accurate speaker location, the speaker tracking cameraman is designed zoom out to encompass a larger frame area, thereby likely bringing the speaker back into the image frames processed by the speaker tracking cameraman.

As noted above, each type of virtual cameraman includes a set of predefined behaviors which differentiate the various virtual cameramen from each other, and define how each virtual cameraman is to process or react to its incoming video feed. It should be noted that any desired type of virtual cameraman can be created by defining a new type of virtual cameraman and creating a set of predefined behaviors for that cameraman. That new virtual cameraman would then be included along with the other abstracted objects for use and control by the virtual director.

Further, it is important to note that multiple virtual cameramen of the same type can be included in a particular control script. In such a case, each virtual cameraman of the same type will be assigned a different name, and assigned to receive an input from a different camera (or a different digital pan, tilt, or zoom from a single camera). For example, two or more "overview cameramen" can be used in combination with any number or combination of the other predefined cameraman types. In this case, each of the two overview cameramen would be assigned a different name in the control script, such as, for example, "overview-one" and "overview-two." In this manner, each of the two overview cameramen can be separately addressed by different portions of the control script.

Further, in one embodiment, when queried by the virtual director, each virtual cameraman returns a confidence level which indicates the likelihood that each particular virtual cameraman can accomplish its assigned viewing task. In other words, the virtual cameramen are capable of providing a confidence level indicating the likelihood that they can successfully return the desired video shot. In a related embodiment, each virtual cameraman also returns a score which indicates how good a particular shot is likely to be. For example, the slide tracking cameraman will typically always have a high score, because it just needs to show the presentation slides without needing to move or zoom in or out. Further, in this example, the confidence level will be high shortly after a new slide appears and decrease with time since differences between adjacent frames of the same slide will typically be negligible in comparison to the differences between adjacent frames representing different presentation slides.

3.2.3 Histogram-Based Speaker Tracking:

As noted above, in one embodiment, the speaker tracking cameraman is responsible for locating the speaker in the video, and ensuring that the image frames passed by the speaker tracking cameraman are generally framed around the speaker. As noted above, any of a number of conventional tracking systems can be used to position the associated camera, either physically or via a digital pan, tilt or zoom of a high resolution video feed so as to maintain the speaker within the desired portion of the image frames output by the speaker tracking cameraman.

In a tested embodiment, tracking results were updated every quarter to half a second. However, this update period can easily be modified to better reflect actual camera frame rates and anticipated speaker motions relative to the computing power available for tracking. Whenever there is a new input video frame, and enough time has elapsed, the speaker tracking cameraman will update the location of the speaker using its tracking algorithm. Alternately, the tracking algorithm or process can be separated completely from the speaker tracking cameraman, such that the speaker tracking cameraman is simply designed to receive and act on an input of speaker location from a standalone or otherwise independent tracking function, which may be included in the abstracted objects, or may be a separate application or DLL that is simply called by the abstracted objects for use by the virtual cameramen.

As noted above, in one embodiment, rather than use a conventional tracking system, the virtual video studio employs a histogram-based tracking function with height-based weighting of binary pixel differences between contiguous images frames to generally locate both the speaker and the approximate location of the speakers head within each image frame.

In particular, histogram-based tracking function operates by first computing a difference, D, between the current and last tracked image frame, frames $F_i$ and $F_{i-1}$, respectively, with B representing a binary difference between those frames. In other words, as illustrated by Equation 1 and Equation 2:

$$D=|F_i-F_{i-1}| \quad \text{Equation 1}$$

and $$B=\text{Threshold}(D) \quad \text{Equation 2}$$

Then, given the binary difference B, a histogram, H, is constructed for each column in B, with each column having a fixed width of one or more pixels. While larger column widths may be used, column widths of one pixel were used in a tested embodiment, and seem to produce good results. Construction of the histogram, H, is accomplished as follows: for every on pixel (i.e., for each binary "1") in a column of B, increment that columns location in the histogram by a weighting factor, r, where the value for r is proportional to the row height of any particular pixel in the image frame. Pixels that are higher in the image are more likely to correspond to the speakers head, and thus are weighted by higher values of r. This gives the speakers head higher weights than lower parts of the body.

Consequently, the histogram, H, serves to represent the number of difference pixels in any given column, with the peak of the histogram, H, being closely centered on the current horizontal location of the speakers head. Further, the histogram, H, is searched for the peak closest the last position of the speaker, the highest pixel in B, around that peak is then assumed to be the speakers head location, which is then updated for the speaker tracking cameraman. Further, H is also searched for additional peaks which indicate the presence of more than one person in the shot.

In one embodiment, conventional temporal filtering of the speakers tracked location is used to keep track of the speakers locations over some period of time so as to set an appropriate zoom level for generally keeping the speaker within the within the image frame. In particular, the speaker tracking cameraman keeps a small buffer of where the speaker has been in order to set an appropriate zoom level. If the speaker moves out of the frame, while on-air, the speaker tracking cameraman will direct the camera to physically or digitally slowly pan towards the estimated position of the speaker. Alternately, the virtual director will make a transition cut to an overview shot from the overview cameraman and then, when the location confidence is sufficiently high, another transition cut back to the speaker shot from the speaker tracking cameraman, with the speaker again reframed at the center of the image frame.

In smaller rooms a single high resolution digital video camera, such as, for example, an Aplux digital camera with a 1.3 mega-pixel resolution, has been observed to be appropriate for tracking using the histogram-based process described above. However, in larger rooms, where the camera is typically further from the speaker, a conventional Pan-Tilt-Zoom (PTZ) type camera, such as, for example, the aforementioned Sony™ EVI-D30 tends to provide better, or higher resolution, scene capture than the digital camera. However, for scene viewing and capture purposes, in one embodiment, the tracking is accomplished using the input from the high resolution digital camera. The PTZ-type camera is then pointed and zoomed to capture the view of the speaker based on tracking input derived from the digital camera. One reason for using the digital camera for tracking and the PTZ-type camera for scene capture is that tracking using the high-resolution digital camera tends to be significantly faster than panning or zooming the PTZ-type camera for tracking operations.

Figure 3:
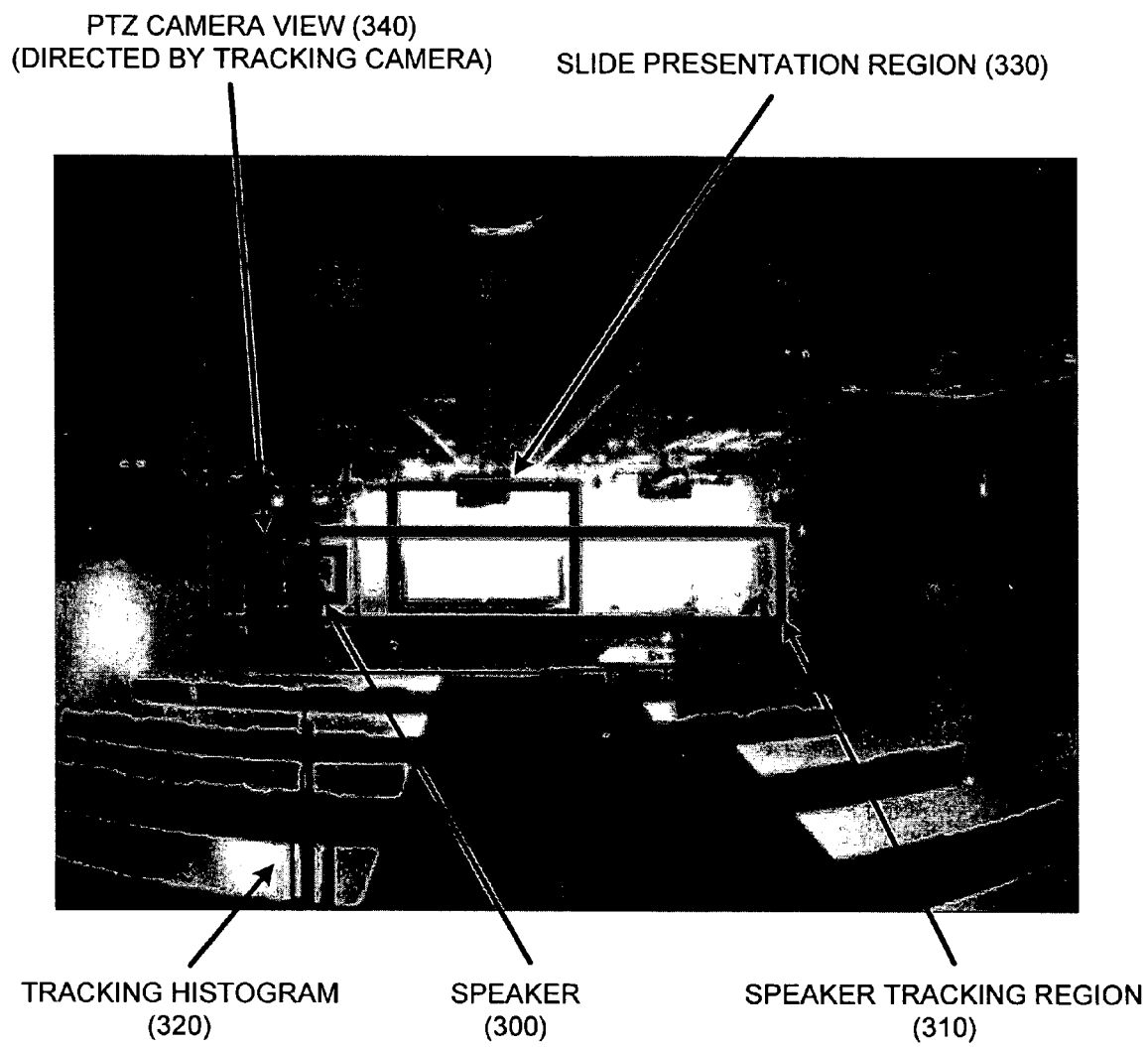
FIG. 3 provides an example of using an overview camera to provide video input of different regions of a lecture room for use by the virtual video studio, as described herein.
Figure 5:
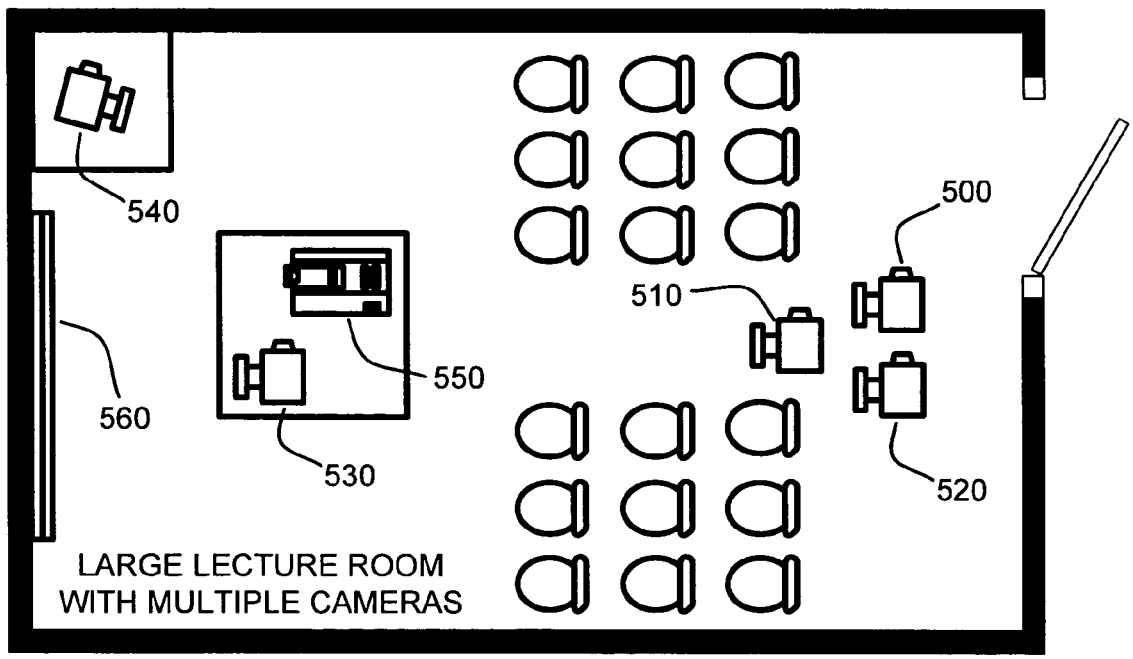
FIG. 5 is an exemplary layout of a large lecture room showing the use of a plurality of cameras by the virtual video studio, as described herein.

FIG. 3 shows an example of information available to and generated by the speaker tracking cameraman when used for tracking a speaker 300 in a larger room, such as the lecture room depicted in FIG. 5. In particular, FIG. 3 illustrates the large horizontal rectangle 310 as the area (i.e., the speaker tracking region) that is being tracked. The medium sized rectangle 330 near the center of the image represents a predefined area that is monitored by the slide tracking cameraman for tracking presentations such as PowerPoint™ slide shows. In one embodiment, tracking is not performed in the presentation region monitored by the slide tracking cameraman, since movement on the screen may potentially be falsely viewed as a tracked speaker. The speakers head is bounded by a small rectangle 300 rectangle. Finally, the small rectangle 340 slightly above and to the left of the rectangle 300 bounding the speakers head represents the estimated view of where the PTZ-type camera is currently viewing (based on the tracking input from the digital camera). Note that the histogram, H, 320 of the speaker location is shown at the bottom of the image for illustrative purposes only.

3.3 Scripting Language/Control Script:

As noted above, besides setting up the physical cameras, and providing the generic abstraction objects representing the virtual director and virtual cameramen, the virtual video studio requires a control script containing the videography rules and referencing the physical cameras that are used by the virtual director for controlling the broadcast status of the various virtual cameramen (i.e., preview, ready, on-air, and off-air), and thus the real-time video output of the virtual video studio for a specific lecture room. In general, the control script defines the types of virtual cameramen to be used and state transitions of the system state machine which describes the operation of the virtual video studio. As noted above, the separation between these two parts, i.e., the abstraction objects and the control script, allows for straightforward portability of the virtual video studio to a variety of locations and configurations.

In general, when designing the control script, the user specifies the types of the virtual cameramen to be used, the various states in the system, and the videography rules for transitioning between the various states. Further, each virtual cameraman is given a name and assigned to monitor one or more particular physical cameras. As noted above, the abstract objects representing each virtual cameraman is one a plurality of "types" which include a set of rules that defines the behavior of each virtual cameraman.

Further, also as noted above, the transitions between the various states are based on one or more sets of rules in the control script which typically contain one or more conditions. When a set of these conditions is met, the virtual director will switch to another state specified by the transition. In addition, as noted above, one or more of the conditions may also include confidence levels and/or scores which are evaluated in determining whether a particular condition is met.

In yet another embodiment, one or more of the virtual cameramen is also assigned a broadcast time. In the event that a particular cameraman has broadcast a particular view for its assigned time, the virtual director will then is select another virtual cameraman for broadcast so as to provide a variety of views in the output video.

Finally, any or all of the aforementioned scripting rules, including states, transition rules, confidence levels, scores, and broadcast times are combinable and editable via a user interface so to as to provide a desired level of user control over the automatically generated video that is derived from the broadcast transitions of the virtual cameramen under the direction of the virtual director.

Figure 4:
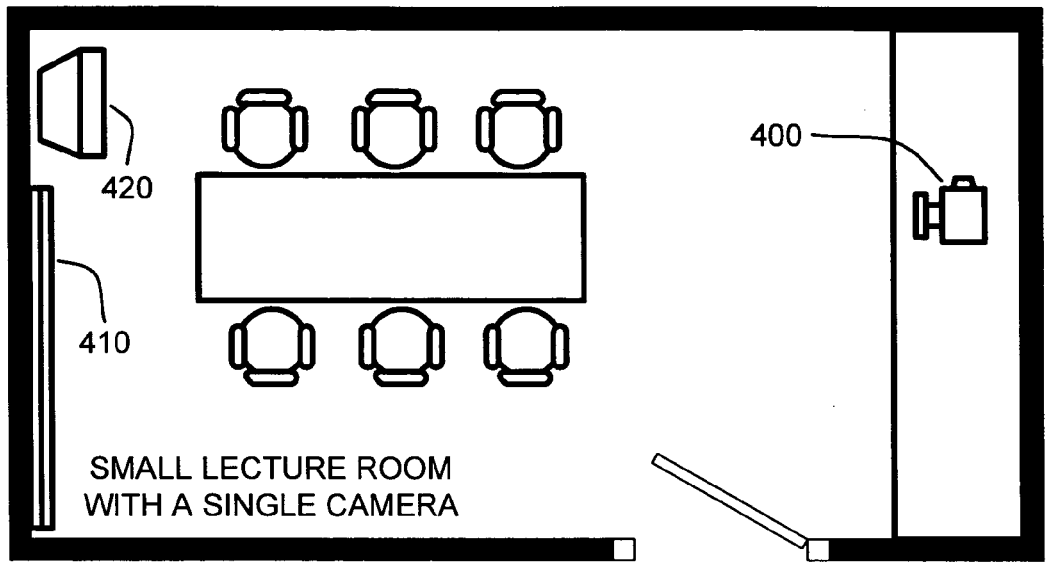
FIG. 4 is an exemplary layout of a small lecture room showing the use of a single camera by the virtual video studio, as described herein.

3.3.1 Example Control Script for a Single Camera Setup:

FIG. 4 is a simple layout of small lecture room. There is a white board or presentation screen 410, and a monitor 420 in the front of the room. The center of the room has a conference table. In the back of the room is a workspace where a computer is set up with a single physical camera 400 set up to record lectures in the room. The assumed use of this room is that participants will sit around the table, and the leader (i.e., the presenter) will stand in the front of the room using the white board and/or monitor to present information. In this example, the physical camera is an Aplux 1.3 mega-pixel digital video camera operating at 10 frames per second. This camera represents three virtual cameramen: overview, speaker tracking, and slide tracking.

A simple control script for defining the videography rules to be used with the single camera 400 in the lecture room illustrated by FIG. 4 is illustrated by sample videography rules 1 through 22 provided below in Table 1. Note that the below listed rules assume that for visual effects, presenters use either the white board 410 or the monitor 420 in the front of the room. Further, the actual physical areas of the lecture room that were being monitored by each virtual cameraman using the camera 400 were predefined by simply selecting particular regions of the room using the aforementioned user interface.

TABLE 1

Exemplary Control Script

1. VIRTUAL CAMERAMEN NAMES:

2. Overview, OverviewCam, 0
3. Slide_Tracking, SlideCam, 0
4. Speaker_Tracking, TrackerCam, 0
5. STATE NAMES:

6. Overview, OverviewCam
7. Slide, SlideCam
8. Tracking, TrackerCam
9. INITIALSTATE:

10. Overview
11. MINSHOT 5
12. MAXSHOT 60
13. STATE TRANSITION RULES:
14. ALLSTATES 15. CONFIDENCE, SlideCam, 7, G
16. Slide, 1.0

TABLE 1-continued

Exemplary Control Script

17. Slide

18. TIME, 8, G
19. Tracking, 2.0, Overview, 1.0
20. Overview

21. TIME, 8, G
22. Tracking, 2.0, Slide, 0.5
23. Tracking

24. CONFIDENCE, TrackerCam, 4 L
25. TIME, 45, G
26. Overview, 1.0, Slide, 1.0

In the sample control script illustrated in Table 1, line 1 indicates that the various virtual cameramen types to be used are first called out with individual type names and physical camera assignments. In particular, in the following lines (2-4), each virtual cameraman to be used in the control script is assigned a name for scripting purposes and is also assigned a physical camera input. For example, line 2 names a first virtual cameraman as "OverviewCam," assigns it to a virtual cameraman type of "overview cameraman," as described above, and assigns it the video feed being provided from physical camera 0. Similarly, line 3 names a second virtual cameraman as "SlideCam," assigns it to a virtual cameraman type of "slide tracking cameraman," as described above, and again assigns it the video feed being provided from physical camera 0. Finally, line 4 names a third virtual cameraman as "TrackerCam," assigns it to a virtual cameraman type of "speaker tracking cameraman," as described above, and again assigns it the video feed being provided from physical camera 0. Note that as described above, more than one camera can be used and referenced in the control script, and that this example uses only one camera only for the purpose of providing a simple working example.

Next, line 5 indicates that the following lines (lines 6-8) will define or name the various "states" that are to be used in controlling the transitions between the various camera views controlled by each virtual cameraman. As noted above, these state names are for scripting purposes. In particular, naming or labeling the states in this manner allows for easy transition from one state to another by using the state names as control points or headers for the moving or jumping to particular points in the control script which define a state transition. For example, line 6 names the state in which the view provided by "OverviewCam" is being broadcast as simply "Overview." Similarly, line 7 names the state for in which the view provided by "SlideCam" is being broadcast as simply "Slide." Finally, line 8 names the state in which the view provided by "TrackerCam" is being broadcast as simply "Tracker." Therefore, when the conditions are satisfied for any of these three states, the virtual director will direct a transition to another state, and thus another view corresponding to that new state, depending upon the how the conditions are scripted.

Further, it should be noted that one or more physical cameras can simultaneously exist in multiple states. In particular, as noted above, each virtual cameraman is associated with a particular physical camera. Therefore as in this example where three different virtual cameramen are associated with the same physical camera, the various states associated with each virtual cameraman will apply simultaneously to the same physical camera, with the view that is actually being broadcast from the physical camera being dependent upon the current states associated with each of the various virtual cameramen. Further, in the case where a particular virtual cameraman is intended only to provide tracking information for another camera, and is not intended to be allowed to actually broadcast, the virtual cameraman associated with that information only camera would not actually exist in any state.

Next, line 9 indicates that initial or global parameters of the state machine are set by the following lines. In particular, as indicated in line 10, the system will begin operation in the "overview" state. Line 11 provides a global timer which indicates that regardless of whether any state transition conditions are met, no shot (i.e., no video broadcast time) will last less than 5 seconds (i.e., MINSHOT 5). Similarly, line 12 provides another global timer which indicates that regardless of whether any state transition conditions are met, no shot (i.e., no video broadcast time) will last longer than 60 seconds, (i.e., MAXSHOT 60). In the unlikely case where 60 seconds elapses without meeting any state transition conditions, the virtual video studio will transition to one of the states, other than the current state at random. Note that a bias can also be applied here, such that one state is more likely than another for the random transition. Examples of the use of such biases is provided below with respect to the discussion of the specific videography rules or condition defining when each state will transition to another state.

For example, line 13 indicates that the following lines (lines 14-26) will define the transitions rules for any of the named states defined in lines 6-8. For example, lines 14-16 define a global state ("ALLSTATES") that applies regardless of which camera view is being broadcast by a virtual cameraman. In particular, in accordance with line 15, whenever the confidence level of the second virtual cameraman (e.g., SlideCam) is greater than 7 (on a relative scale of 0 to 10, 10 being absolute identification of a new slide), then a transition to the Slide state is immediately ordered. Note that the "G" following "7" in line 15 indicates "greater than." Then, as indicated by line 16, as soon as the conditions of line 15 are satisfied, a transtion to the Slide state is ordered with a bias of 1.0. Note that since there are no other possible states transitions defined in the ALLSTATES state, the use of a bias of 1.0 indicates an absolute transition to the Slide state. As soon as the Slide state is entered, the virtual director orders the view being monitored by SlideCam (as defined by line 7) to be broadcast.

In addition, it should be noted that one effect of the rules of the ALLSTATES transition rules is that in the case where two new slides in a row are detected, the resulting transition will be from Slide state to the Slide state as soon as the new slide is detected. However, it should be noted that in view of the MINSHOT rule described above, the transition to the new instance of Slide state will not occur for at least five seconds from the time that the initial Slide state was entered. One effect of this transition from Slide state to Slide state is that it essentially resets a Slide state timer, as described in the following paragraph.

Consequently, it should be clear that depending upon how the control script is written, it is possible for any particular state to transition to either any other state, or back to the same state, whenever the appropriate conditions are satisfied. Again, the basic effect of transition from a current state back to that same state is to reset either a state timer or a global timer (or both), if any such timers have defined in the control script.

Next, line 17 of the control script indicates that the following lines (lines 18-19) will define the rules for transitioning away from the view being monitored by SlideCam when the transition rules of the Slide state are met. Specifically, line 18 specifies that once the view being monitored by SlideCam is broadcast for greater than 8 seconds, a transition away from the Slide state will be ordered as indicated by line 19. Specifically, line 19 indicates that the transition away from the Slide state will go to either the Overview state, or the Tracking state, with a bias towards transitioning the to the Tracking state of 2.0 verses a lesser bias towards transitioning to the Overview state of 1.0. As a result, given a random state transition, it is twice as likely that the virtual director will order a transition to the Tracking state relative to the Overview state. As soon as either the Overview or the Tracking state is entered, the virtual director orders the view being monitored by either OverviewCam (as defined by line 6), or TrackerCam (as defined by line 8) to be broadcast, depending upon which state is selected.

Line 20 of the control script then indicates that the following lines (lines 21-22) will define the rules for transitioning away from the view being monitored by OverviewCam when the transition rules of the Overview state are met. Specifically, line 21 specifies that once the view being monitored by OverviewCam has been broadcast for greater than 8 seconds, a transition away fro the Overview state will be ordered, as indicated by line 22. In particular, line 22 then indicates that the transition away from the Overview state will go to either the Tracking state, or the Slide state, with a bias towards transitioning to the Tracking state of 2.0 verses a lesser bias towards transitioning to the Slide state of 0.5. As a result, given a random state transfer, it is four times as likely that the virtual director will order a transition to the Tracking state relative to the Slide state. As soon as either the Tracking or the Slide state is entered, the virtual director orders the view being monitored by either TrackerCam (as defined by line 8), or SlideCam (as defined by line 7) to be broadcast, depending upon which state is selected.

Finally, line 23 of the control script indicates that the following lines (lines 24-26) will define rules for transitioning away from the view being monitored by TrackerCam when the transition rules of the Tracking state are met. According to line 24, this transition should occur whenever tracking confidence is less than 4 (on a relative scale of 0 to 10, 10 being absolute certainty of a successful location of the speaker), meaning the speaker has probably been lost, or, according to line 25, whenever the shot lasts longer than 45 seconds. From the Tracking state, the virtual director will order a transition to either the Overview state or the Slide state with equal probability, since each of these transition states is assigned a bias of 1.0 in accordance with the videography rule of line 26. As soon as either the Slide or the Overview state is entered, the virtual director orders the view being monitored by either SlideCam (as defined by line 7), or OverviewCam (as defined by line 6) to be broadcast, depending upon which state is selected.

In the case of a larger lecture room using multiple cameras, such as, for example, the lecture room illustrated by FIG. 5, the control script will be similar to the script described above, but will include additional virtual cameraman names and camera assignments, state names, and state transition rules for allowing the virtual director to direct each of the virtual cameramen, and thus the camera views being broadcast at any given time.

For example, as illustrated by FIG. 5, the front of the lecture room has a white board/screen 560 for projected 550 presentations. There are five physical cameras 500, 510, 520, 530, and 540, and four virtual cameramen. Specifically, the cameras in this room are: two overview cameras (front of classroom and audience, 540 and 510, respectively), one slide camera 530, one PTZ-type camera 500, and one monitoring camera tied to the PTZ camera so as to provide tracking information for pointing and zooming the view of the PTZ-type camera. In this case, the monitoring camera is not used for broadcast, but rather to drive the PTZ-type camera 500, as described above. As with the smaller room illustrated by FIG. 4, the control script for this room will specify that the slide camera should be used whenever a new slide appears. The speaker should be tracked as much as possible, and the two overview cameras and slide camera may be used with various biases to add variety to the video.

Figure 6:
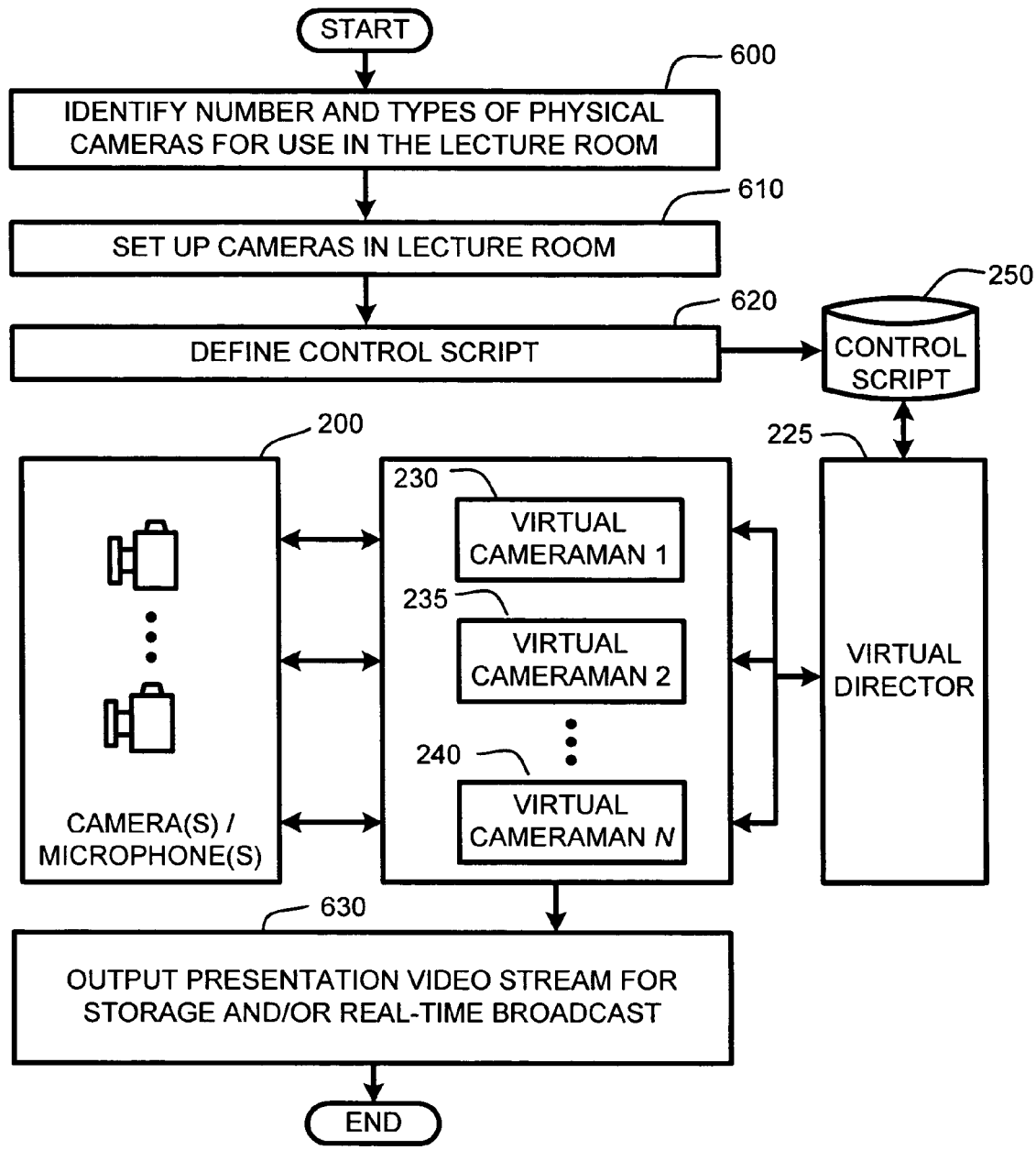
FIG. 6 provides an exemplary flow diagram which illustrates operational flow of a virtual video studio, as described herein.

4.0 Virtual Video Studio Operation:

The processes described above with respect to FIG. 2 and in view of the detailed description provided above in Section 3 are summarized by the general operational flow diagram of FIG. 6, which illustrates an exemplary operational flow diagram showing one generic embodiment of the virtual video studio.

In particular, as illustrated by FIG. 6, the virtual video studio described herein begins operation by first identifying the number and types of physical cameras 600 that will be used in the lecture room wherein the presentation will be captured. Once the actual physical cameras have been identified, they are physically installed or otherwise set up 610 in appropriate positions within the lecture room to enable those cameras to capture any scenes of interest.

Once the cameras have been set up, the next step is define the control script 620 which acts as a bridge between the physical cameras and the abstraction objects represented by the virtual director and virtual cameramen. Once the presentation begins, the control script 250 is continuously interpreted in real-time by the virtual director 225 in combination with confidence levels reported by each virtual cameramen 230, 235, and 240. As a result, the virtual director operates to order and control state transitions and thus the internal status of the various virtual cameramen 230, 235, and 240.

At the same time, each of the virtual cameramen 230, 235, and 240. operate independently in accordance with the behavioral rules of their predefined types to capture the best shot possible given the constraints of that particular virtual cameraman type. In addition, as noted above, each of the virtual cameramen 230, 235, and 240 reports its current internal status, and the confidence levels indicating whether each cameramen is currently successfully capturing a view of its assigned subject.

As described above, each of the virtual cameramen 230, 235, and 240 receives the input from one of the physical cameras 200. Under control of the virtual director 225, one or more of the virtual cameramen 230, 235, and 240 then outputs its captured video stream when directed to do so by the virtual director. Given the control of state transitions, and thus of the current broadcast status of the various virtual cameramen 230, 235, and 240, the output video streams are used to form an automatically edited composite of the presentation in real-time which is then output 630 for storage and/or real-time broadcast.

The foregoing description of the virtual video studio has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the virtual video studio. It is intended that the scope of the invention be limited not by this detailed description, but rather by the claims appended hereto.

What is claimed is:

1. An automated video production system for creating a composite video of a presentation in an arbitrary lecture room given a set of one or more camera inputs, comprising:
   a set of predefined user selectable abstracted objects which include one or more predefined virtual directors and one or more predefined virtual cameramen;
   a set of one or more physical cameras, each physical camera capable of capturing one or more views within the lecture room during a presentation;
   a graphical user interface for selecting a virtual director and one or more virtual cameramen from the set of abstracted objects for inclusion in a user scriptable set of videography rules;
   wherein the user scriptable set of videography rules includes a user selected assignment of one or more of the set of physical cameras to one or more of the selected virtual cameramen, said assignments being made via the graphical user interface, and wherein the user scriptable set of videography rules defines a layout of the arbitrary lecture room;
   wherein each of the virtual cameramen receives and processes an input video stream from its assigned physical camera, said processing of the input video stream being performed in accordance with predefined videography rules associated with each of the particular virtual cameramen;
   wherein the virtual director automatically and continuously interprets the set of user scriptable videography rules in real-time during the presentation for automatically ordering broadcast transitions to specific virtual cameramen in accordance with the set of videography rules; and
   selecting whichever of the virtual cameramen is ordered to a broadcast transition by the virtual director as each automatic transition order occurs, and providing the processed input video stream of the selected virtual cameramen as a current input to a continuous composite video stream of the presentation.

2. The automated video production system of claim 1 wherein the set of videography rules further includes:
   at least one state definition; and
   at least one set of transition rules for determining whether a broadcast transition is to be ordered by the virtual director as a result of satisfying any of the transition state definitions.

3. The automated video production system of claim 2 wherein the at least one set of transition rules includes a bias setting for favoring transition to one broadcast over another during a random selection of broadcast states.

4. The automated video production system of claim 2 wherein the scriptable set of videography rules further includes one or more of:
   a minimum time for transitioning between broadcast states;
   a maximum time for transitioning between broadcast states;
   a confidence level for indicating whether a particular virtual cameraman is currently successfully capturing its associated view of the lecture room; and
   a score which indicates how good a particular video shot is likely to be.

5. The automated video production system of claim 1, wherein two or more of the virtual cameramen each process an output of a single high resolution camera to provide a different one of the views within the lecture room.

6. The automated video production system of claim 1, wherein the predefined virtual cameramen include one or more of:
- a virtual overview cameraman for capturing an overview of the lecture room;
- a virtual slide tracking cameraman for capturing a view of an area of the presentation room in which presentation slides are displayed; and
- a virtual speaker tracking cameraman for capturing a view of a presenter within the presentation room.

7. The automated video production system of claim 6, wherein the virtual speaker tracking cameraman automatically tracks a current location of the presenter within the presentation room.

8. The automated video production system of claim 7, wherein automatically tracking the current location of the presenter within the presentation room comprises using a histogram-based tracking system for locating a horizontal position of the presenter and an approximate vertical position of the presenters head.

9. The automated video production system of claim 7, tracking the current location of the presenter within the presentation room further comprises automatically bracketing an area around the location of the presenter with one of the set of one or more cameras so as to ensure that the presenter is within the image frames of the input video stream being received by the virtual speaker tracking cameraman.

10. A computer-readable medium having computer-executable instructions for performing the automated video production system of claim 1.

11. A method for capturing a composite video of a presentation in a lecture room, comprising:
- providing a set of predefined user selectable abstracted objects which include one or more predefined virtual directors and one or more predefined virtual cameramen;
- providing a graphical user interface for editing a user adjustable control script to specify one or more of the user selectable abstracted objects, including one of the virtual directors and a set of at least one virtual cameramen;
- automatically determining a user configurable number, type, and layout of video cameras to be used to capture a presentation in a particular lecture room based on user selectable abstracted objects specified in the user adjustable control script to automatically construct a set of videography rules specific to the number, type, and layout of video cameras, and to the particular lecture room;
- wherein the specified virtual director represents an abstract control script interpreter for automatically interpreting the videography rules in real-time;
- wherein the specified set of virtual cameramen represent a set of one or more video processors, each video processor having a defined type, and each video processor being responsible for monitoring an input from at least one of the number of cameras;
- using the abstract control script interpreter to control output states and transitions for each video processor; and
- wherein the abstract control script interpreter directs combining a sequential output from one or more of the video processors to create a composite video of the presentation in compliance with the set of videography rules of the control script.

12. The method of claim 11 wherein the defined types of video processors comprise at least one of:
- a virtual overview cameraman for capturing an overview of the lecture room;
- a virtual slide tracking cameraman for capturing a view of an area of the presentation room in which presentation slides are displayed; and
- a virtual speaker tracking cameraman for tracking and capturing a presenter within the presentation room.

13. The method of claim 12 wherein at least one of the virtual cameramen is capable of directing pan, tilt and zoom operations for the camera being monitored by that virtual cameraman.

14. The method of claim 13 wherein the pan, tilt and zoom operations are preformed digitally on a digital video input.

15. The method of claim 13 wherein the pan, tilt and zoom operations are directed to be performed by a camera with automatic pan, tilt and zoom capabilities.

16. The method of claim 11 wherein the control script is in a human readable format.

17. A computer-readable storage medium having computer executable instructions for providing a portable video production system, said computer executable instructions comprising:
- providing a user interface for configuring a user adaptable set of video production rules;
- wherein the video production rules include a set of predefined user selectable abstracted objects which include one or more predefined virtual directors and one or more predefined virtual cameramen, and wherein the user scriptable set of videography rules define a layout of an arbitrary lecture room;
- wherein the video production rules further include a user selectable set of one or more cameras coupled to a computer, and wherein assignments of each selected camera to one or more of the selected virtual cameramen are specified via the user interface;
- capturing a plurality of input video streams of a presentation in the lecture room by using the selected cameras to capture one or more unique views in accordance with video capture characteristics associated with the virtual cameramen assigned to the specific cameras;
- wherein each virtual cameraman receives an input video stream from one of the cameras; and
- wherein the virtual director automatically interprets the set of user adaptable video production rules on an ongoing basis in real-time for the purpose of ordering one or more of the virtual cameramen to output a processed version of the input video streams received by those virtual cameramen.

18. The computer-readable medium of claim 17 wherein ordering one or more of the virtual cameramen to output a processed version of the input video streams includes transitioning from a video broadcast of one virtual cameraman to another in accordance with the set of video production rules.

19. The computer-readable medium of claim 18 wherein the user configurable set of video production rules further include one or more of:
- a bias setting for favoring transition to one video broadcast over another during a random selection of video broadcasts from between one or more of the virtual cameramen; and
- at least one set of transition rules for determining when a transition from one video broadcast to another is to be ordered by the virtual director.

20. The computer-readable medium of claim 19 wherein the set of video production rules further includes one or more of:

a minimum time for transitioning between video broadcasts;

a maximum time for transitioning between video broadcasts;

a confidence level for indicating whether a particular virtual cameraman is currently successfully capturing a particular view of the lecture room; and a score which indicates how good a particular video frame is likely to be.

21. The computer-readable medium of claim 17, wherein a single high resolution camera provides the input video stream to two or more of the virtual cameramen while producing different views of the presentation via any of a digital pan, tilt, or zoom of the input video stream by one or more of the virtual cameramen.

22. The computer-readable medium of claim 17, wherein the set of virtual cameramen includes one or more of:

a virtual overview cameraman for capturing an overview of the lecture room;

a virtual slide tracking cameraman for capturing a view of an area of the presentation room in which presentation slides are displayed; and a virtual speaker tracking cameraman for capturing a view of a presenter within the lecture room.

23. The computer-readable medium of claim 22, wherein the virtual speaker tracking cameraman automatically tracks a current location of the presenter within the lecture room by using a histogram-based tracking system for locating a horizontal position of the presenter and an approximate vertical position of the presenters head.

* * * * *